United States Patent
Spedini et al.

(10) Patent No.: US 8,863,571 B2
(45) Date of Patent: Oct. 21, 2014

(54) FILLING LEVEL METER FOR MEMBRANE GASOMETERS

(75) Inventors: Luigi Spedini, Cremona (IT); Lorenzo Spedini, Cremona (IT)

(73) Assignee: Ecomembrane SRL, Gadesco Pieve Delmona (CR) (IT)

( * ) Notice: Subject to any disclaimer, the term of this patent is extended or adjusted under 35 U.S.C. 154(b) by 236 days.

(21) Appl. No.: 13/322,467

(22) PCT Filed: May 20, 2010

(86) PCT No.: PCT/IB2010/001257
§ 371 (c)(1),
(2), (4) Date: Nov. 25, 2011

(87) PCT Pub. No.: WO2010/136885
PCT Pub. Date: Dec. 2, 2010

(65) Prior Publication Data
US 2012/0067117 A1    Mar. 22, 2012

(30) Foreign Application Priority Data
May 27, 2009  (IT) .............................. CR2009A0019

(51) Int. Cl.
*G01F 17/00* (2006.01)
*F17B 1/26* (2006.01)
*G01F 22/00* (2006.01)

(52) U.S. Cl.
CPC . *G01F 17/00* (2013.01); *F17B 1/26* (2013.01); *G01F 22/00* (2013.01)
USPC .......................................................... 73/149

(58) Field of Classification Search
None
See application file for complete search history.

(56) References Cited

U.S. PATENT DOCUMENTS

| | | | | | |
|---|---|---|---|---|---|
| 2,582,886 | A | * | 1/1952 | Ruge | 73/862.53 |
| 3,596,510 | A | * | 8/1971 | Paine et al. | 73/149 |
| 4,451,817 | A | * | 5/1984 | Zulliger | 338/47 |
| 4,815,547 | A | * | 3/1989 | Dillon et al. | 177/25.14 |
| 7,698,936 | B2 | * | 4/2010 | Curello et al. | 73/149 |
| 2003/0172748 | A1 | * | 9/2003 | Specht | 73/862.391 |

FOREIGN PATENT DOCUMENTS

| | | |
|---|---|---|
| DE | 86 11 307 U1 | 1/1987 |
| EP | 0 333 698 A2 | 9/1989 |
| EP | 1 338 843 A2 | 8/2003 |
| FR | 2 766 255 A1 | 1/1999 |
| FR | 2 898 974 A3 | 9/2007 |
| JP | 2004-150525 A | 5/2004 |
| WO | 2005/075951 A2 | 8/2005 |

OTHER PUBLICATIONS

International Search Report, dated Aug. 2, 2010, from corresponding PCT application.

* cited by examiner

*Primary Examiner* — Robert R Raevis
(74) *Attorney, Agent, or Firm* — Young & Thompson

(57) ABSTRACT

Filling level meter (4) for membrane gasometer (1), including at least one accumulation chamber (C1) arranged for containing a gas, and an impermeable flexible membrane (2) capable of moving between two positions corresponding to the chamber being totally full and totally empty, wherein the meter (4) includes:
  an instrument (12) associated with a fixed element (3, 9), arranged for generating a signal of measurement of a physical value that can be correlated to the quantity of gas contained in the chamber (C1);
  elements for processing and displaying (5) the value of the quantity of gas corresponding to the generated signal; a filiform, flexible element (6) for connecting the instrument (12) and the membrane (2); the filiform, flexible element (6) including at least one portion constituted by an elastic member (7).

8 Claims, 4 Drawing Sheets

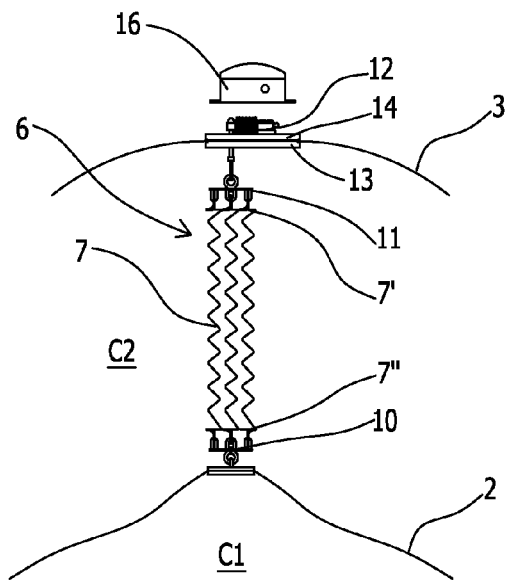
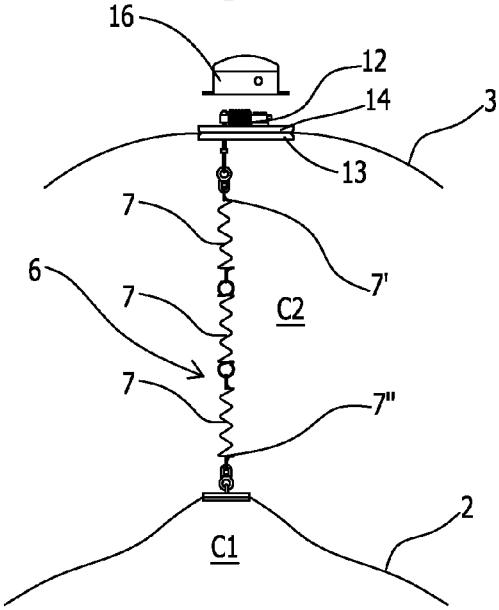
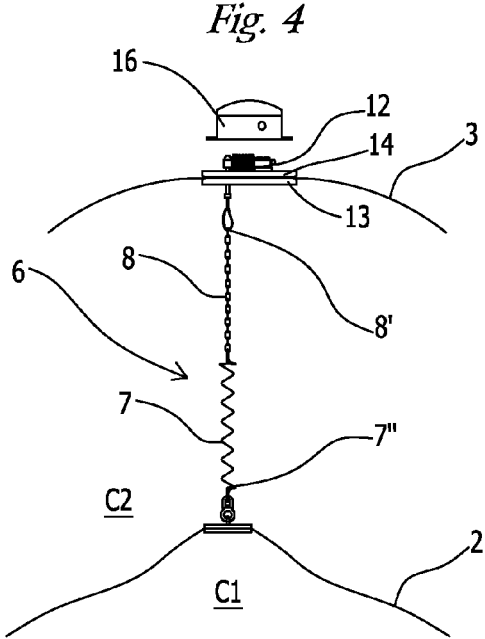

FILLING LEVEL METER FOR MEMBRANE GASOMETERS

FIELD OF THE INVENTION

The present invention relates to the membrane gasometer sector, particularly usable for the storage of biogas (biological gas) generated by the digestion of sludge, sewage and organic substances in general, or for the storage of gas emanating from accumulation tanks for sewage containing fermentable material.

BACKGROUND OF THE INVENTION

More specifically, the invention relates to a level meter suitable for continuously measuring the quantity of gas or biogas contained in said gasometers or gasholders.

According to known art, membrane gasometers consist of a closed shell made of an airtight membrane.

An improved technique is used in the manufacture of pressostatic-type membrane gasometers, which comprise a first inner membrane (gas membrane), which delimits a gas accumulation chamber, and a second more external membrane (air membrane), arranged for creating a pressurisation chamber between the two membranes, generally filled with air, adjacent to said gas accumulation chamber.

The accumulation chamber is connected to inlet and outlet pipes for the gas contained therein, or it communicates directly with a tank below for the storage of liquids or sludges, from which said gas emanates.

The pressurisation chamber, on the other hand, is connected to an auxiliary air ventilator or to a compressor, enabling a given pressure to be maintained inside the chamber.

In a common type of pressostatic gasholders, the first membrane forms a dome above a base area, and the second membrane forms an outer dome that encloses the first one.

Said base area can be a concrete base, for example, lined with another membrane attached to the first membrane along the edge, or the same surface of a liquid in which the edge of the first membrane is immersed.

Most traditional membrane gasometers generally have a hemispherical dome, spherical cap, "three quarter sphere" or cylindrical dome shape, the latter having a base area with a substantially rectangular or elliptical shape.

Membranes are flexible, generally made of a fabric of polyester fibres spread over a plastic material, for example PVC, and must be well anchored to the ground or to a specific fixed structure.

For the correct use of said gasometers, it is necessary to know the extent of filling of the gas accumulation chamber, both for the management and regulation of the gasholder, during normal operation, and for safety purposes. Since the second membrane encloses the first externally, this is not possible with a simple visual inspection, and requires the use of a specific measuring device.

According to known art, there are two different types of measuring devices for this purpose: a first type comprises instruments that can be defined as "distance measurement" devices, while a second type comprises instruments that can be defined as "force measurement" devices.

The first type of instrument enables to measure the distance between the top of the first membrane and the corresponding top of the second membrane. As a matter of fact, the latter generally maintains the same form, since it is pressurised, while the first membrane rises and falls depending on the quantity of gas it contains; consequently, the measurement of the distance between the tops of the membranes gives a value that can be easily correlated geometrically to the quantity of gas contained in the accumulation chamber.

To this aim, patent application FR 2 766 255 describes the use of an echo instrument, generally an ultrasonic probe, associated with the outer membrane, arranged for emitting wave impulses in the direction of the inner membrane. Said impulses strike the inner membrane and are reflected and re-directed back towards the emitting instrument: the time taken for the waves to go and return is processed and converted into an electrical signal proportional to the measurement of the distance between the two membranes, and then correlated to a value of the volume of gas contained in the accumulation chamber, expressed as a percentage or as an absolute value, and displayed on a specific digital indicator panel capable of generating a voltage or current signal, generally 0-12 volts or 4-20 mA. This echo instrument is often used with a flat metallic disc, a sort of target, placed on the top of the inner membrane, and intended as a safe reflective surface for the ultrasonic waves.

A second "distance measurement" instrument is described in patent EP 0 333 698, which describes a system comprising a reel stably fixed to the top of the outer membrane of the gasometer, from which a wire unwinds, the end thereof being fixed to the top of the inner membrane. The reel is provided with a torsional spring arranged for rewinding the wire itself. As the wire unwinds or rewinds, following the movements of the inner membrane as it rises or falls as the gas content varies, a potentiometer records the rotation of the reel and thus gives a measurement of the distance between the tops of the membranes, which can also be correlated to the volume of gas contained in the accumulation chamber and displayable on a suitable digital indicator panel capable of generating a suitable electrical signal.

This first type of device for measuring the quantity of gas contained in the accumulation chamber of gasometers has certain disadvantages, common to both applications described above.

The gas membrane, since it is made of a non-stretch, non-elastic cloth, when the accumulation chamber empties, collapses and falls in on itself, forming folds and loops. In addition, the shape assumed by the accumulation chamber during each gas emission cycle is different: this leads to a non bijection between the values recorded by the measurement instruments and the actual volume of gas present in the chamber.

This disadvantage is accentuated if the gasometer is not a hemispherical dome or spherical cap type gasometer. In particular, if the gasometer comprises a ¾ sphere dome, the gas membrane, when the accumulation chamber empties, as well as collapsing and creating loops, may become unbalanced and fall outside its projected area, leading to even more imprecise measurements.

Furthermore, the weight concentrated on the first membrane of the flat metallic disc used in association with the ultrasonic probe has a negative influence on the shape of the gas accumulation chamber, thus causing unbalance of the same membrane when the chamber empties: the membrane tends to fall in an unbalanced, uncentered manner with respect to the projected area of the dome, thus leading to an imprecise volume reading subject to casual errors that are different for each cycle and therefore cannot be standardised. In an attempt to remedy this problem, the cited patent suggests the use of connecting cables between the first and second membranes, arranged regularly along the maximum circumference of the spherical surface. Said solution, although preventing the loss of balance, disadvantageously distorts the volume reading: when the disc touches the surface on which the gasometer rests, the gasometer is not empty, but inside the accumulation chamber, in the remaining semi-toroidal shape area that forms around the disc, there remains a considerable quantity of gas. Inside the gasometer, therefore, the volumetric value recorded and used for the storage capacity is considerably lower than the actual rated geometric volume.

The main disadvantage of using a cable fixed to the top of the inner membrane is that the continuous cycles of winding and unwinding the cable tend, over time, to damage the torsional spring used to rewind the cable and, consequently, the device can no longer ensure precise readings of the recorded value. Lastly, the weight of the gas membrane is always greater than the cable retraction force provided by the elasticity of the torsional spring in the reel: this leads to the inevitable unbalancing of the membrane when the accumulation chamber empties, with the creation of a peripheral volume of gas that cannot be detected.

As previously mentioned, there exists a second type of instrument for measuring the quantity of gas accumulated in gasometers, which can be defined as "force measurement" devices, which comprise means of measuring the weight of a flexible element hooked onto the outer membrane of the chamber of pressurisation air and supported by the gas membrane. These instruments correlate a dynamometric measurement of the weight force to the quantity of gas contained.

Patent application EP 1 338 843 from the same applicant describes the use of a measurement instrument of such a type, comprising a chain, one end thereof hanging from a load cell type device applied to the top of the outer membrane, while the other end is free, and simply rests on the top of the gas membrane. A raised edge is placed on the top of said gas membrane, arranged for delimiting a narrow zone on which said chain rests and in which it is contained.

The load cell measures the overall weight of the chain that is not supported by the gas membrane and provides an electrical signal. When the accumulation chamber is partially or completely filled with gas, a part of the chain rests on the top of said chamber and the load cell measures the traction due only to the weight of the part of the chain that remains suspended. In this way, the electrical signal generated by the load cell provides an indirect measurement of the height of the top of the accumulation chamber.

Advantageously, this measurement can be easily correlated to the quantity of gas stored, besides the raised edge keeps the chain resting on the central area of the top of the accumulation chamber, preventing the chain from sliding sideways, which could compromise the precision of the measurement.

However, for the measurement of the quantity of gas present, this second solution also has several disadvantages.

The chain also constitutes, although to a lesser extent than the metallic disc used in association with the ultrasonic probe, a load on the central portion of the inner membrane, which is thus still subject to the risk of becoming unbalanced and falling in an uncentered manner with respect to the projected area of the dome of the gasometer and, disadvantageously, there remains the risk of erroneous and imprecise measurements by the load cell due to the effect of the residual volume remaining in the peripheral area when the central zone of the membrane has already reached the base plane, corresponding to the maximum distance away from the top of the outer membrane.

SUMMARY OF THE INVENTION

Aim of the present invention is to eliminate all the problems and disadvantages described above and found in all the various measurement techniques traditionally used.

Main aim of the present invention is to provide a device for membrane gasholders arranged for continuously measuring the quantity of gas contained in the accumulation chamber, providing a precise measurement, with a unique correspondence between the value measured by the instrument and the real quantity of gas contained in the accumulation chamber.

Specifically, aim of the invention is to control the fall of the gas membrane so that the membrane itself does not become unbalanced, and ensuring that emptying of the accumulation chamber starts from the peripheral areas of the gasometer, while the top of the membrane is the last portion of the membrane to touch the base plane.

A further aim of the present invention is to provide a measurement device that does not use a non-stretching mechanical connection between the two membranes, thereby avoiding the risk of tears or lacerations caused by relative movements between the membranes themselves.

Lastly, a further aim of the present invention is to provide a device for measuring the quantity of gas contained in the accumulator that is simple and economical to manufacture, easy to install and gives precise readings of the values recorded.

These aims are achieved with a filling level meter for membrane gasometers consisting of at least one accumulation chamber arranged for containing a gas, comprising an impermeable, flexible membrane capable of moving between two positions corresponding to the chamber being totally full and totally empty, wherein said meter comprises:

an instrument associated with a fixed element, arranged for generating a signal of measurement of a physical value that can be correlated to the quantity of gas contained in said chamber;

means for processing and displaying the value of the quantity of gas corresponding to said generated signal;

a filiform, flexible means for connecting said instrument and said membrane;

characterized in that said filiform, flexible means comprises at least one portion constituted by an elastic means.

According to a first preferred embodiment of the invention, said instrument is a device arranged for detecting a tractive force, and in particular is a dynamometer or load cell.

According to further preferred embodiments of the invention, said filiform means comprises a helical spring, a plurality of helical springs arranged in series or in parallel, or in sequence with respect to a mechanical traction organ, such as a heavy chain, for example, i.e. with a weight per unit length comparable to the tractive force developed by the elastic means.

According to a further embodiment of the invention, said filiform means comprises two ends arranged along the vertical direction established by the force of gravity g, and in particular arranged so that the distance between two ends thereof is a minimum when the accumulation chamber is completely filled.

The main advantage obtained with this invention is the possibility of regulating the fall of the gas membrane when the accumulation chamber empties, so as to prevent the formation of folds and loops and prevent the membrane from becoming unbalanced, which could distort the measurements. This is even more advantageous for ¾ sphere gasometers, preferred because they are less bulky on the ground, but tend to become unbalanced more easily during emptying.

Advantageously, the invention ensures that emptying of the accumulation chamber always starts from the peripheral zones of the gasometer, while the top of the membrane is the last part to touch the ground, due to the upward traction that the elastic means exercises on the membrane of the accumulation chamber.

Advantageously, the shape assumed by the accumulation chamber is substantially the same during every cycle of filling and emptying and the values read by the meter correspond univocally to the actual volume of the gas present in the chamber. This results in precise, extremely reliable measurement.

A further advantage is represented by the use of elastic means for connecting the instrument to the gas membrane, which are useful for absorbing stresses caused by the working cycles or by outside agents on the gas membrane, in order to avoid tears or damage to the membrane and to prevent the risk of gas leaks.

A further advantage is represented by the ease of installation of the instrument, and to the even easier reading of the values recorded.

BRIEF DESCRIPTION OF THE DRAWINGS

These and other advantages of the invention will become more apparent from the following detailed description of preferred embodiments of the invention, which is illustrated by way of non-limitative example in the accompanying drawings, in which:

FIGS. 2-4 show a front view of level meters according to possible variants of the invention;

DETAILED DESCRIPTION OF THE PREFERRED EMBODIMENTS

Figure 1:
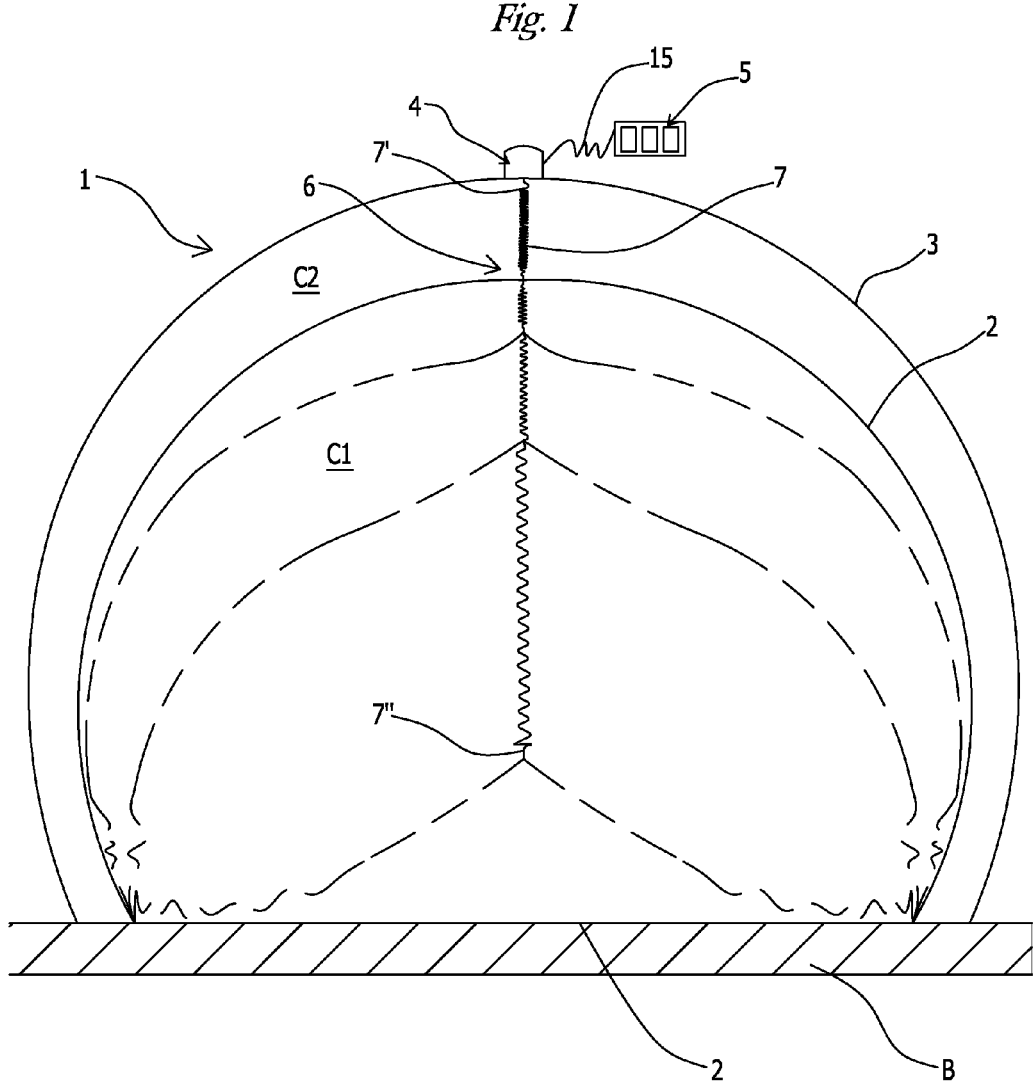
FIG. 1 shows a schematic transverse cross-section view of a membrane gasholder of a pressostatic type with a ⅔ sphere shape with different filling levels, with a filling level meter according to the present invention.

With reference to FIG. 1, the gasometer 1 illustrated is a pressostatic type placed on a base B and comprised of a first inner membrane 2 and a second outer membrane 3. Said membrane 2 delimits a gas accumulation chamber C1, while said membrane 3 delimits an air pressurisation chamber C2 included, for example, between the two membranes and the base B.

Said chamber C1 is closed at the bottom by a base area, impermeable to gas. Said area consists, according to known art, of a distinct impermeable membrane, or of the same membrane 2 closing over itself, or of impermeable rigid materials and the surface of the liquid contained in a tank.

Said chamber C1 is generally connected to known means (not shown) for the inlet and outlet of gas, while said chamber C2 is connected to known means (not shown) for blowing of pressurisation air, control and pressure regulation.

Both membranes 2 and 3 are anchored to a base B by means of mechanical fastenings (not shown) according to known art.

On the top of the gasometer 1, there is a level meter 4 according to the invention, which enables a measurement of the quantity of gas contained in said accumulation chamber C1.

With reference to FIGS. 2, 3 and 4, said level meter comprises an instrument 12 associated with said second membrane 3 by means of a flange 13 and counter-flange 14 connection, and connected electrically by means of a cable 15 to remote means 5 for processing and displaying an electrical signal generated by the values recorded by said instrument 12.

A filiform, flexible means 6, of a type at least in part elastic, connects said instrument 12 to said membrane 2.

Said instrument 12, protected by a cap 16 and stably fixed to the second membrane 3, is arranged for generating a signal of measurement of a physical value that can be correlated to the quantity of gas contained in the accumulation chamber C2. In particular, said instrument 12 is a device that can continuously detect a tractive force, and is generally chosen from known devices for this purpose, such as load cells or dynamometers.

Said means 5 of processing and display, connected to the instrument 12, are arranged for receiving said electrical signal of measurement and convert it into a value that can be displayed, as an absolute value or as a percentage, corresponding to the quantity of gas contained in the chamber C1, as well as a variable current or voltage value within a finite interval.

Said filiform, flexible means 6, arranged for connecting said measurement instrument 4 to said membrane 2, comprises a helical spring 7 with an elastic constant K, specifically chosen to stretch in order to allow the gasometer to empty, but at the same time able to support a good part of the weight of the membrane 2 without yielding.

In particular, the two ends 7'-7" of said spring 7 are arranged along the direction of the force of gravity g, so that the whole spring 7 takes a vertical position, perpendicular to the base B and substantially centered with respect to the area defined by the planimetric projection of accumulation chamber C1.

With reference to FIG. 2, the said filiform, flexible means 6 comprises a plurality of helical springs 7, arranged in parallel.

In particular, said springs 7 are fixed by their ends 7'-7" to two metal plates 10-11, which are in turn connected to the membrane 2 and to the instrument 12 respectively, so that the tractive force exerted by the membrane and detected by the instrument 12 is evenly distributed, and enabling a correct reading of the volume of gas contained in the accumulation chamber C1.

With reference to FIG. 3, said filiform, flexible means 6 comprises a plurality of helical springs 7, arranged in series, so that they can extend, shorten and support the membrane 2 without yielding the entire elastic means 6.

The ends 7'-7" of the outer helical springs 7 in the series, are in turn connected to the instrument 12 and to the membrane 2 respectively.

With reference to FIG. 4, a variant of the level meter is illustrated, wherein the filiform means 6 consists of both an elastic portion, i.e. a helical spring 7 with a suitable elastic constant K, and a heavy mechanical, non-stretching traction organ, such as a chain 8, for example, with a weight per unit length comparable to the tractive force developed by the elastic portion, arranged in series, so that the end 8' of the chain 8 is connected to the instrument 12, while the end 7" of the spring 7 is connected to the membrane 2.

The filiform, flexible means 6 connecting the measuring instrument 4 and the membrane 2, in all its variants always comprises at least one elastic portion 7, in order to transmit to said instrument 4 traction stresses, proportional to the distance between the two membranes, and to support the gas membrane.

Figure 5:
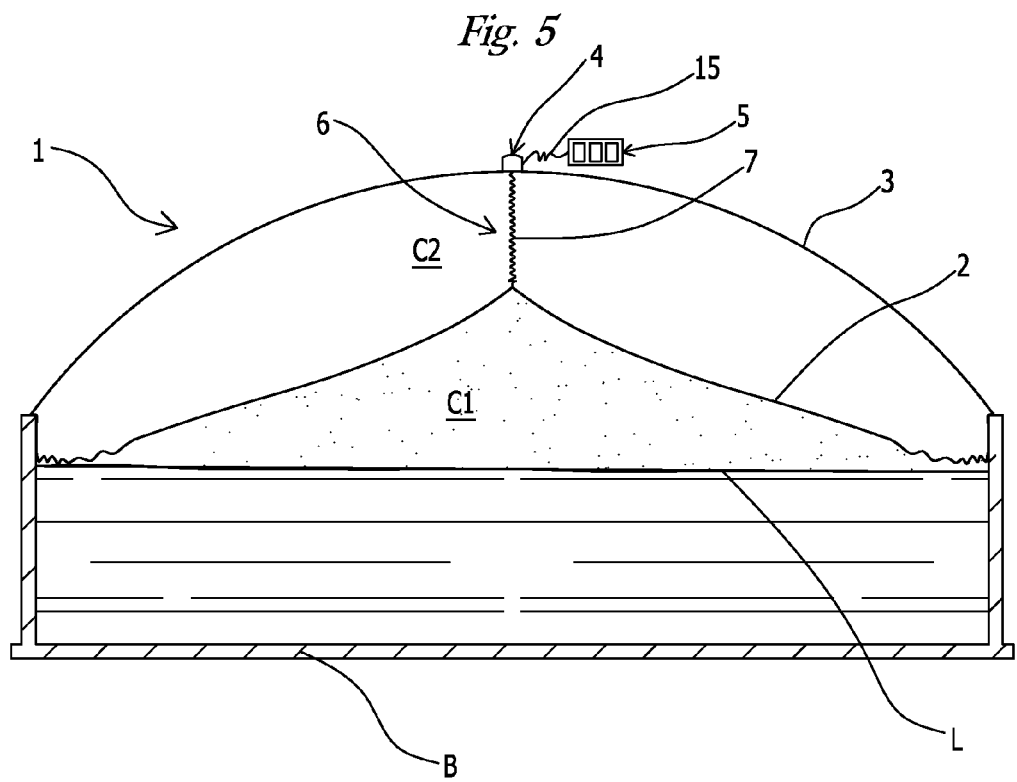
FIGS. 5 and 6 show a transverse cross-section view of membrane gasometers of the domed pressostatic type, in which the gas accumulation chamber is closed at the bottom by a liquid surface.
Figure 6:
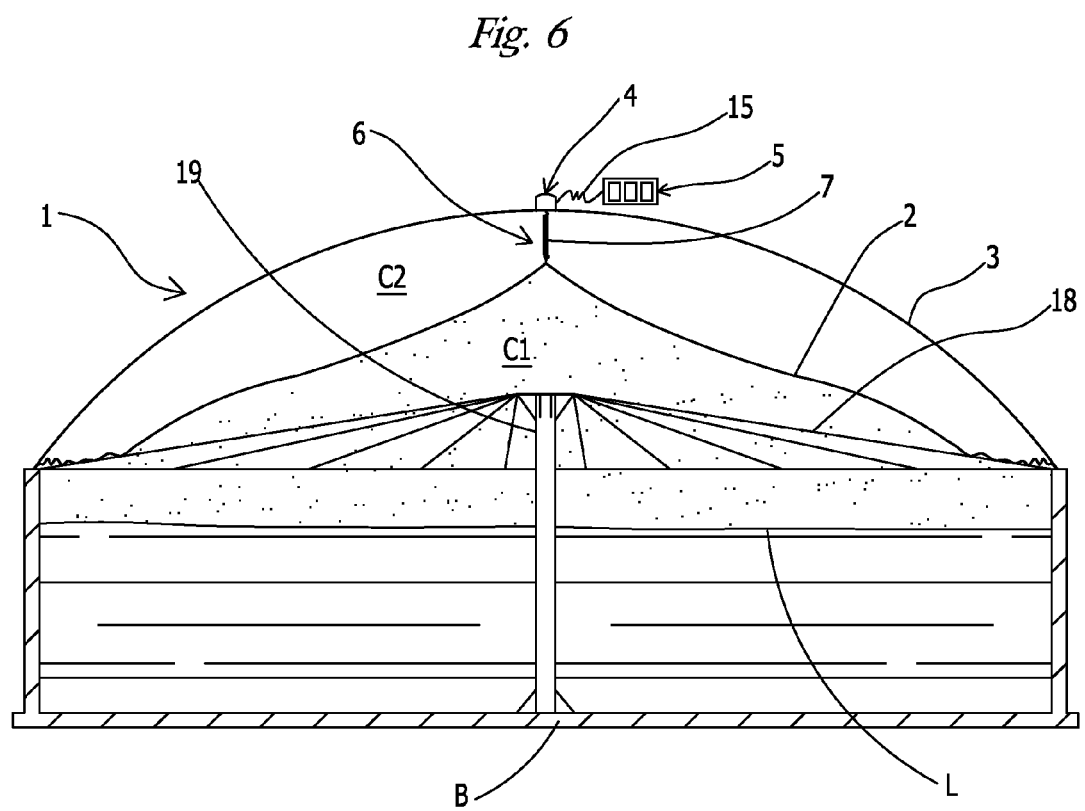

FIGS. 5 and 6 show the application of the invention to pressostatic type membrane gasometers 1, wherein the base area of the gas accumulation chamber is formed by the surface of a liquid L and the chamber itself is partially enclosed by the walls of the tank. In the case of FIG. 5, the membrane 2 rests on the liquid L, while in the case of FIG. 6 it rests on a net 18 (or on a wooden roof) supported by a central pole 19.

Figure 7:
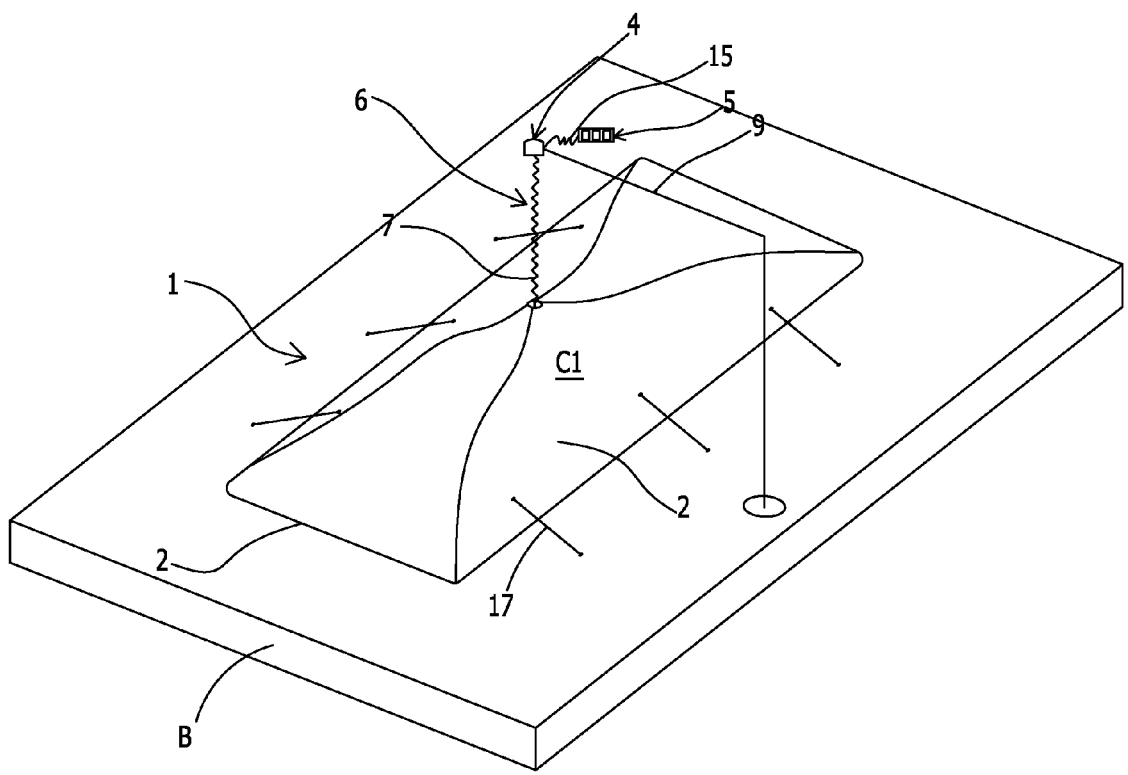
FIG. 7 shows, a transverse cross-section view of a cushion-type single-membrane gasometer, with a filling level meter according to the present invention.

FIG. 7 shows the application of the invention to a non-pressostatic shell type gasometer 1, i.e without a compensation chamber C2, and therefore provided with only one membrane 2, arranged for acting as an accumulation chamber C1 with a substantially cushion-like shape, and filiform means 17 of anchoring the gasometer to a base B or to the ground. p The level meter 4, in these variants of the invention also, is constructed in the same manner described above, with the possibility of the same variants.

In particular, in the case of FIG. 7, the level meter 4 can be supported, instead of by the top of the membrane 3, which is no longer present, but by a fixed external element 9 anchored to the ground.

According to the present invention, during pressostatic gas accumulator operation, the chamber C1 fills with or empties of gas, varying its shape and volume, while the chamber C2 is maintained at a certain level of constant pressure. The result is that the membrane 2 moves to positions between the two extreme situations, corresponding to chamber C1 being totally full and totally empty, while the membrane 3 maintains its position and its shape, since it is stably connected to the ground and is pressurised by air blown by suitable means.

With accumulation chamber C1 totally full, the helical spring with elastic constant K, reaches its minimum elongation Lmin corresponding to the minimum distance between the two membranes 2 and 3. In said condition, the instrument 4 records a tractive force equivalent to the product of the constant K and the minimum elongation Lmin, and using the display 5 converts said force value into an absolute value or percentage corresponding to the actual volume present in the chamber C1, which is substantially equivalent to the maximum capacity of the gasometer 1.

With accumulation chamber C1 totally empty, the helical spring with elastic constant K, reaches its maximum elongation Lmax corresponding to the distance between the membrane 3 and the base area, and exerts a maximum upward tractive force on the membrane 3. In said condition, the instrument 4 records a tractive force equivalent to the product of the constant K and the maximum elongation Lmax, and allows the conversion of said force value into an absolute value or percentage corresponding to the actual volume present in the chamber C1, which is substantially equivalent to zero.

During the various measurement phases, the instrument 4 will record intermediate tractive force values between the two extreme situations described above, the means 5 will process said values, generating visual indications of volume corresponding to the actual quantities of gas present in the accumulation chamber C1 instant by instant, and an electrical signal that can be correlated to the same quantity.

In the context of the same inventive idea, the helical spring 7 can clearly be replaced by an elastic element arranged for serving the same function, such as an elastic cable for example, while the mechanical traction organ 8 of the heavy chain type can be replaced by non-stretching wires or cables, which may be weighed down by loads arranged along their length at regular intervals.

The invention as described and illustrated achieves the set tasks and aims. In practice, it is clear that all the details regarding geometry, shape, dimension and materials details can be replaced by other functionally equivalent, without straying from the scope of protection of the claims.

The invention claimed is:

1. A filling level meter (4) for membrane gasometers (1) that include at least one accumulation chamber (C1), arranged for containing a gas, that comprise an impermeable flexible membrane (2) that moves between two positions corresponding to the chamber being totally full and totally empty, wherein said meter (4) comprises:
an instrument (12) connectable to a fixed element (3, 9), arranged for generating a signal of measurement of a physical value that corresponds to a quantity of gas contained in said accumulation chamber (C1);
means for processing and displaying (5) the value of the quantity of gas corresponding to said generated signal; and
a filiform, flexible means (6) for connecting said instrument (12) and said membrane (2),
wherein said filiform, flexible means (6) comprises at least one portion constituted by a plurality of helical springs (7) that are arranged either in series or in parallel.

2. The level meter (4) according to claim 1, wherein said instrument (12) is a device arranged for detecting a tractive force.

3. The level meter (4) according to claim 2, wherein said instrument (12) is a load cell.

4. The level meter (4) according to claim 2, wherein said instrument (12) is a dynamometer.

5. The level meter (4) according to claim 1, wherein said instrument (12) is a load cell.

6. The level meter (4) according to claim 1, wherein said instrument (12) is a dynamometer.

7. The level meter (4) according to claim 1, wherein said filiform, flexible means (6) has ends (7', 7", 8') arranged along the direction of the force of gravity (g).

8. A membrane gasometer (1) comprising a level meter (4) according to claim 1.

* * * * *